(12) United States Patent
Winter

(10) Patent No.: US 9,565,842 B1
(45) Date of Patent: Feb. 14, 2017

(54) MULTIPLE BARB FISH HOOK

(71) Applicant: Lynn A. Winter, Bloomington, MN (US)

(72) Inventor: Lynn A. Winter, Bloomington, MN (US)

( * ) Notice: Subject to any disclaimer, the term of this patent is extended or adjusted under 35 U.S.C. 154(b) by 727 days.

(21) Appl. No.: 13/986,692

(22) Filed: May 24, 2013

(51) Int. Cl.
*A01K 83/00* (2006.01)

(52) U.S. Cl.
CPC .................................... *A01K 83/00* (2013.01)

(58) Field of Classification Search
CPC ................................ A01K 83/00; A01K 83/06
USPC ....... 43/43.16, 44.81, 44.82, 43.1, 44.2, 42.7
See application file for complete search history.

(56) References Cited

U.S. PATENT DOCUMENTS

| 523,988 | A | | 8/1894 | Martin |
|---|---|---|---|---|
| 620,896 | A | | 3/1899 | Edgar |
| 627,179 | A | | 6/1899 | Dresse |
| 842,594 | A | | 1/1907 | Van Vleck et al. |
| 2,164,807 | A | | 7/1939 | Evans |
| 2,668,387 | A | | 2/1954 | Gallardo |
| 2,906,054 | A | | 9/1959 | Morehead |
| 4,557,065 | A | | 12/1985 | Rye |
| 4,757,634 | A | | 7/1988 | Meixsell, Jr. |
| 4,953,321 | A | | 9/1990 | Furuta |
| 5,024,020 | A | * | 6/1991 | Sitton ..................... A01K 83/00 43/43.16 |
| 5,163,245 | A | | 11/1992 | Russell |
| 5,214,875 | A | | 6/1993 | Hoben et al. |
| 5,237,772 | A | | 8/1993 | Gibbs |
| 5,526,603 | A | * | 6/1996 | Fujii ..................... A01K 83/00 43/43.16 |
| 5,685,108 | A | | 11/1997 | Lepage et al. |
| 6,038,806 | A | | 3/2000 | Maitland |
| 6,898,895 | B2 | | 5/2005 | Mendoza et al. |
| 7,159,357 | B2 | | 1/2007 | Sitton |
| D541,900 | S | | 5/2007 | Scott |
| D594,526 | S | | 6/2009 | Ferguson et al. |
| D594,527 | S | | 6/2009 | Ferguson et al. |
| D594,528 | S | | 6/2009 | Ferguson et al. |
| D654,555 | S | | 2/2012 | Rogers |
| 8,201,358 | B2 | | 6/2012 | Dohi |
| 2002/0032979 | A1 | | 3/2002 | Hildman |
| 2002/0050093 | A1 | | 5/2002 | Bahery |
| 2005/0267532 | A1 | * | 12/2005 | Wu ............................... 606/228 |
| 2012/0174468 | A1 | * | 7/2012 | Nakamichi .................. 43/44.81 |
| 2012/0291333 | A1 | | 11/2012 | Bartell |

(Continued)

FOREIGN PATENT DOCUMENTS

FR        2792806 A1  *  11/2000    ............. A01K 83/04

*Primary Examiner* — Danielle Clerkley

(57) ABSTRACT

A fish hook of generally conventional design with the unique features of having a point section of a pyramidal shape with a triangular cross-section. The three sides of the point section are either flat-sided or slightly concave facets extending from the point to the base of the point section. The hook has at least three barbs of different sizes with at least one barb on each edge of the cross-section. The smallest barb is near the point, and the barbs increase in size in increments down to the largest (conventional) barb at the base of the point section. The barb positions rotate sequentially in 120 degree increments around the axis of the point section from the top barb near the point to the bottom barb at the base of the point section. This multiple barb arrangement and the cutting edges of the facets results in increased and more secure hookups.

14 Claims, 3 Drawing Sheets

(56) References Cited

U.S. PATENT DOCUMENTS

2012/0291334 A1\* 11/2012 Bartell ..................... 43/44.82

\* cited by examiner

MULTIPLE BARB FISH HOOK

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to fish hooks and in particular pertains to fish hooks having point sections with three facets and more than one barb.

BACKGROUND OF THE INVENTION

Fish hooks are typically used by recreational fishermen and sometimes in commercial fishing. Hooks of various sizes and shapes have been developed in attempts to maximize effectiveness for different methods of fishing and for different species of fish. A typical fishhook is formed from a section of round steel wire that has been bent into a U shape at one end and has an eye at the other end to attach a fishing line. The end of the U bend has a sharpened point and usually one barb near the end of the sharpened section a short distance down from the point. A hook having a small barb positioned near the point serves to increase the ability to hook the fish, especially if the fish just nibbles at the bait, while a larger barb further from the point improves the likelihood of preventing the fish from getting free of the hook after it is hooked. It is therefore advantageous to have a fish hook with multiple barbs of progressively increasing size with increasing distance from the point or tip.

Another feature that can improve hooking success is to have the point section faceted to provide cutting edges where the facets join. This allows the point to more easily penetrate the fish's mouth to a depth of penetration past the barb(s). What is needed is a fish hook that can provide initial hooking and barb engagement close to the point of the hook, and then gradually increasing the size of the barbs as the hook continues to penetrate further into the fish's mouth. This can best be accomplished by using a faceted point in combination with a gradually increasing size of barb(s) as the kook penetration progresses.

Although single barb fish hooks with point sections of circular cross-section are most common, some fish hooks with multiple barbs and/or faceted point sections have been developed to improve the effectiveness of hooking fish and preventing the fish from disengaging or shaking the hook loose. An example of a hook with a regular barb and some smaller beards (barbs) is described by Martin in U.S. Pat. No. 523,988, issued on Aug. 7, 1894. The beards, while smaller than the ordinary barb, are all disposed in a vertical alignment upon the inner side of the hook portion below the point, and having the usual inner edge inclined toward the point. The patentee does not include a faceted point section in the description.

Another fish hook with multiple barbs is disclosed by Edgar in U.S. Pat. No. 620,896, issued on Mar. 14, 1899. Here, the barbs are disposed either in the direction toward the shank of the hook or in a direction preferably at right angles to a line extending across the space between the short arm and the shank of the hook. The disclosure does not include any specific differentiation in the sizes of the barbs and does not mention any facets of the tapered point.

In U.S. Pat. No. 2,906,054, issued to Morehead on Sep. 29, 1959, a typical fish hook is described having a slender tapered point wherein the conventional large barb is eliminated and replaced by a large number of very minute spines. The slender tapered point is not faceted and, while the minute spines provide some advantage where only a very light force is required to effect the initial hook-set, a large barb should also be included to further engage the fish's mouth with a final hook-set that penetrates the fish's mouth deeper and provides a more secure purchase to reduce the likelihood of the fish being able to disengage or shake the hook loose.

U.S. Pat. No. 5,214,875, issued to Hoben et al. on Jun. 1, 1993, discloses a fish hook with preferably two barbs of identical size wherein the second barb is located directly behind the first barb. This arrangement of same-sized barbs doesn't contribute substantially in facilitating an easy (light insertion force) hook-set, and the second barb doesn't engage or hold a different part of the fish's mouth from that of the first barb. With the multiple barbs being in general alignment, they don't provide any significant advantage over a single barb, because all of the barbs engage the same penetration point of the mouth. Also, the barbs, as shown in FIG. 3 are located below the triangular-shaped member (104) (the point section). The fish hook would be more effective if the top barb were smaller and disposed up on the triangular section of the point and not directly in line with the second barb.

The above-mentioned disclosures have multiple barbs, but the barbs are not configured in the most advantageous manner to facilitate hooking the fish and retaining the fish on the hook. As detailed herein, there are a number of improvements and features that can be incorporated to greatly increase the effectiveness of a fish hook, especially the point section of a fish hook.

BRIEF SUMMARY OF THE INVENTION

What is needed is a fish hook that provides significant improvements in achieving the following objectives:
(a) To provide a fish hook that gives the angler an immediate hookup when the fish barely nibbles the bait in order to allow the angler to continue the hook-set with deeper penetration of the hook into the fish's mouth.
(b) A fish hook with an extremely sharp point and a sharp edged, faceted point section whereby the facet edges act as cutting edges to allow the hook to penetrate the fish's mouth faster and with the least penetrating force applied by the angler during the hook-set.
(c) A hook with multiple barbs to increase the effectiveness of the hook-set and to attach to a number of positions of the fish's mouth to more securely retain the fish on the hook and reduce the likelihood of the fish being able to dislodge the hook.
(d) A hook with adequate strength and durability for reliable continuous use.
(e) A hook that is practical and relatively inexpensive to manufacture.
(f) A hook that is simple and easy to use.

The hook has an eye for fastening to a fish line. It includes a shank, a U bend, and a point section which are the typical components of a conventional fish hook. The point area, however, is unique and has a number of novel features to improve the effectiveness for hooking a fish and retaining the fish on the hook after it is hooked. The cross-section of the point section is three-sided or faceted to provide three sharp cutting edges to more easily cut the flesh of the fish's mouth to allow the hook to penetrate with very little penetrating pressure required by the angler. The facets can be flat-faced or slightly concave. The point section has a number of barbs of various sizes. The barbs are all located on the facet edges where two adjacent facets converge. The smallest barb is located near the tip of the point area, and the barbs increase in size with their distance from the point, progressing to the largest barb positioned at the base of the point section and facing the shank. The largest barb is sized, configured, and positioned in the manner of that of a conventional fish hook barb. The smallest (first) barb is located nearest the point on a first edge. The next (second) barb is slightly larger than the first barb and is located slightly further from the point on a second edge. The third barb is slightly larger than the second barb and is located slightly further from the point than the second barb on a third edge. The last barb is a conventional fish hook barb and is located at the base of the point section and facing the hook shank. A preferred embodiment has four barbs, but there are at least three barbs, one on each of the three edges, to engage three different points of the fish's mouth. The smaller barbs near the point offer the angler the advantage of a faster, more likely hook-set, and the larger barbs afford the angler deeper penetration of the point and a more secure hookup. The fish is likely to be initially slightly hooked by the smallest barb near the point, even when just nibbling, and then finally and more deeply and securely hooked by the largest (conventional) barb at the base of the point section.

The advantages of the invention are:
(a) The point area of the hook has multiple barbs with the smallest barb located near the point and the largest barb (a conventional barb) at the base of the point section. The smallest barb allows the angler an immediate initial hook-set at one part of the fish's mouth when the fish just nibbles on the bait. The increasingly larger barbs on different edges of the point section provide a more secure attachment to the fish's mouth with deeper penetration into the flesh of the fish's mouth. The angler's hook-set progresses from engaging the smallest barb near the point to the final hookup at the largest (conventional) barb near the base of the point area.
(b) The three sharp edges of the facets of the triangular cross-section act as cutting edges to allow the hook to penetrate the fish's mouth faster and with the least amount of penetrating force applied by the angler during the hook-set. This results in a higher percentage of hookups and more secure hookups.
(c) The hook has multiple barbs to increase the effectiveness of the hook-set and to attach to three different positions of the fish's mouth to more securely retain the fish on the hook and reduce the likelihood of the fish being able to dislodge the hook.
(d) With the barbs positioned on the sharpened edges, the formation of the barbs does not detract significantly from the strength of the point section, because the edges are where there is the most material.
(e) The faceted point section and multiple barbs can be provided with little added cost compared to a simple conventional fish hook.
(f) The fish hook is easy to use with very little adjustment in the angler's method of setting the hook. With a small barb positioned near the point, the angler can perform an initial hook-set sooner than with a conventional hook. This will significantly increase the percentage of the fish that are hooked.

These and other objects, features, aspects, and advantages of the invention will become better appreciated and more clearly understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit and scope thereof, and the embodiments of the invention are intended to include all such modifications.

DRAWING REFERENCE NUMERALS OF THE ELEMENTS

| Element | Element |
| --- | --- |
| 10 fish hook | 22 curve section |
| 12 eye | 26 point |
| 14 eye opening | 28 base |
| 16 shaft | 30 facets 30a, 30b, & 30c |
| 18 offset section | 32 edges 32a, 32b, & 32c |

-continued

| Element | Element |
|---|---|
| 20 shank | 34 barbs 34a, 34b, 34c, & 34d |
| 24 point section | |

DETAILED DESCRIPTION OF THE INVENTION

The examples used herein are intended merely to facilitate an understanding of the ways in which the embodiments of the invention may be practiced and to further enable those having skill in the art to practice the concepts of the invention. Accordingly, the examples given should not be construed as limiting the scope of the invention.

Figure 1:
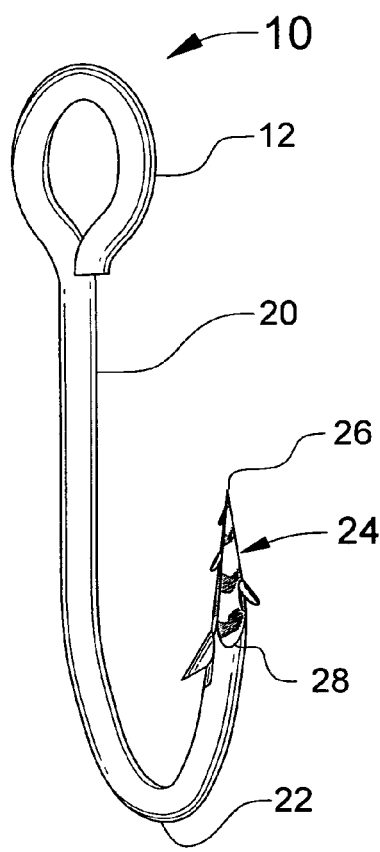
FIG. 1 illustrates a perspective view of the first embodiment of the invention with the fish hook having a straight shank.
Figure 2:
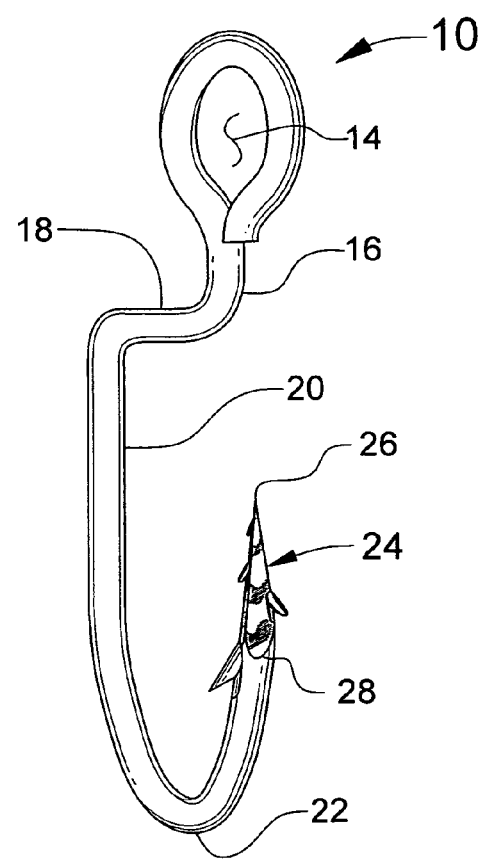
FIG. 2 is a perspective view of a second embodiment of the invention with the fish hook having an offset in the shank.
Figure 3:
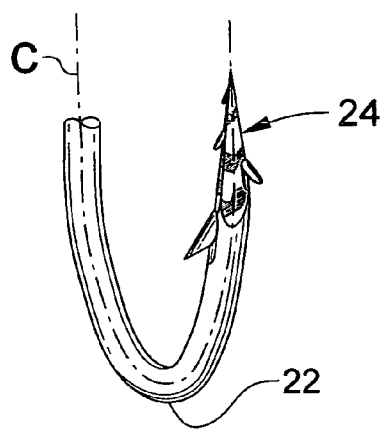
FIG. 3 depicts a partial perspective view of the fish hook showing the curve section and point section of the invention.
Figure 4:
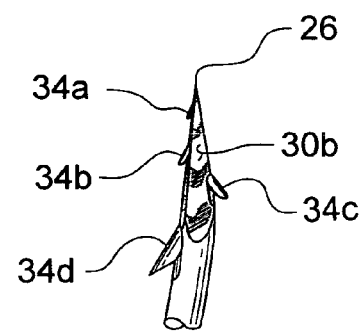
FIG. 4 shows a partial perspective view of the point section and part of the curve section of the invention.
Figure 5:
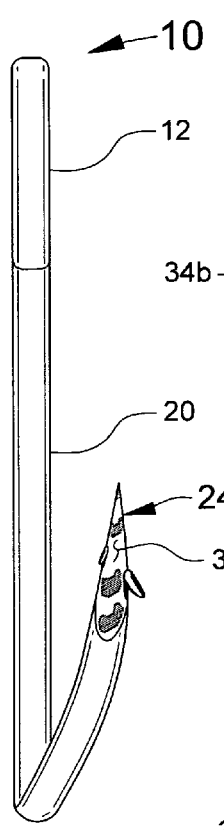
FIG. 5 is a front view of another embodiment of the invention having the point section angled to one side of the plane of the space between the shank and the hook section as that plane is illustrated in FIG. 4.
Figure 6:
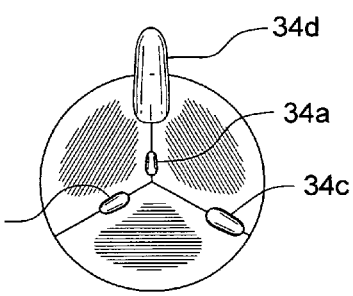
FIG. 6 is a top view of the triangular cross-section of the point section of the fish hook with the point section having three flat facets and four barbs and with the barbs increasing in size from the point downward toward the curve section.
Figure 7:
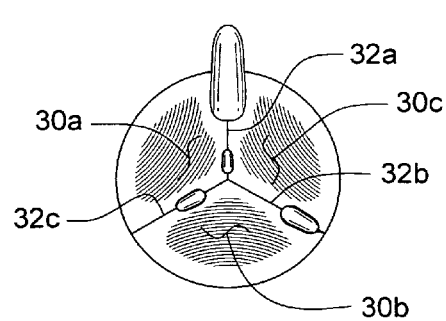
FIG. 7 is the same top view as FIG. 6, but with the point section having three concave facets.

With reference to the drawings, and wherein like numerals designate like parts, and with particular reference to FIG. 1, a multiple barb fish hook 10 comprising an eye 12 with an eye opening 14, a shaft 16 that may include an offset section 18, a shank 20, a curve section 22, and a point section 24. Typically, hook 10 is formed from a round metal wire that has been bent into a hook shape, with an eye 12 at one end and a point section 24 at the other end; however other materials such as carbon or plastic may be used. If hook 10 is formed of plastic, it may be produced by injection molding or an additive manufacturing process. Eye 12 is a small closed loop that defines an eye opening 14 through which a fishing line (not shown) may be threaded and attached. Eye opening 14 is generally small but sufficiently large to allow the fishing line to be threaded through it. Shank 20 can be of various lengths and shapes and is commonly straight as shown in FIG. 1 or having an offset section 18 as shown in FIG. 2. Curve section 22 is generally U-shaped but may have slight variations to accommodate various specialized bait arrangements. Curve section 22 and point section 24 can be configured in a flat plane with shank 20 as shown in FIGS. 1 and 2 or they can be angled to one side as shown in FIG. 5. Eye 12, eye opening 14, shaft 16, offset section 18, shank 20, and curve section 22 are all typical features of commonly available or standard fish hooks.

Figure 8:
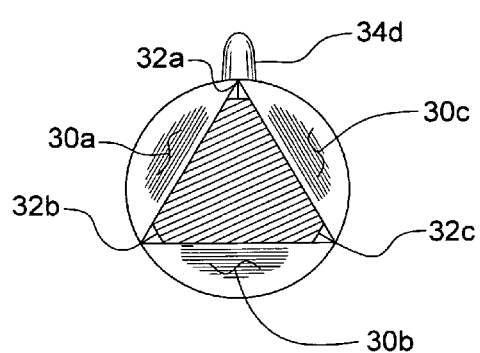
FIG. 8 illustrates a section view through the triangular cross-section of the point section of the fish hook where the point section has three flat facets.
Figure 9:
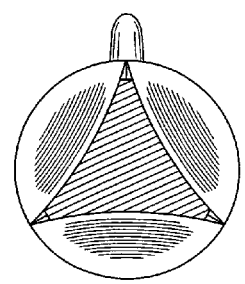
FIG. 9 is the same top view as FIG. 8, but with the point section having three concave facets.
Figure 10:
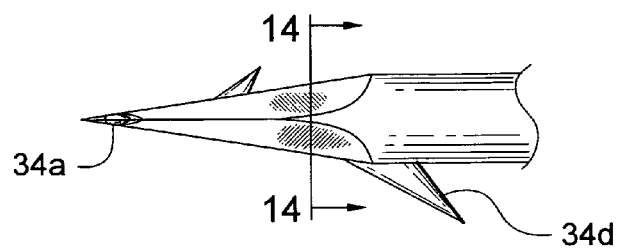
FIG. 10 is an edge view of the hook point section.
Figure 11:
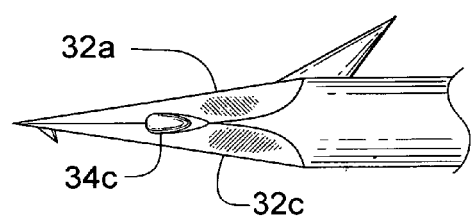
FIG. 11 is another edge view of the hook point section.
Figure 12:
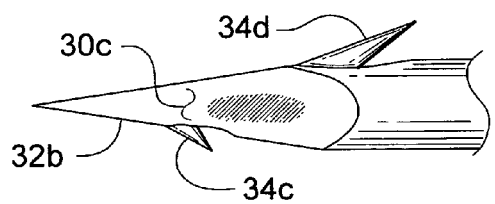
FIG. 12 is a side view of one facet of the hook point section.
Figure 13:
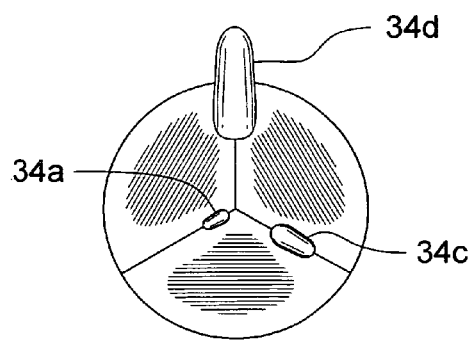
FIG. 13 is a top view of the triangular cross-section of the point section of the fish hook with the point section having three flat facets and three barbs and with the barbs increasing in size from the point downward toward the curve section.
Figure 14:
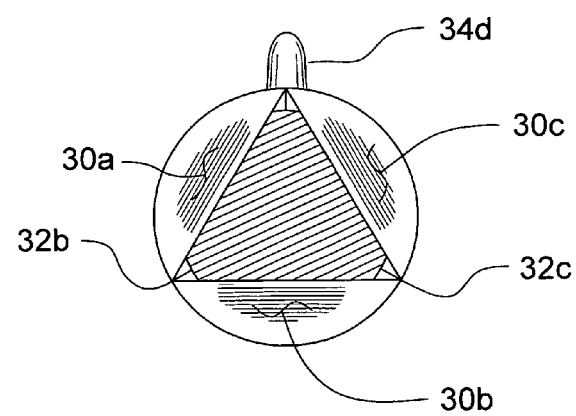
FIG. 14 illustrates a horizontal cross-sectional view through the triangular point section of the fish hook having three barbs taken along Line 14-14 of FIG. 10.

Point Section 24 has a number of unique features to improve the angler's ability to hook and retain fish. Point section 24 has a generally triangular cross-section with three facets 30a, 30b, and 30c extending from the point 26 to the base 28 of point section 24. Facets 28 can be flat faced or slightly concave in viewing a cross-section of point section 24 as shown in FIGS. 8 and 9. The three facets form a triangular pyramid shape having three sloped edges 32a, 32b, and 32c. These sharp edges 32 extend in a straight line from point 26 to the base 28 of point section 24. Edges 32 serve to facilitate cutting into the fish's mouth to minimize the penetration force required by the angler to hook the fish deeply and securely.

In a preferred embodiment, point section 24 includes a number (at least three) of barbs 34a, 34b, 34c, and possibly 34d of various sizes spaced uniformly from near point 26, and progressing to the base 28 of point section 24. In a preferred embodiment, the smallest of four barbs 34a is positioned near point 26 on edge 32a which is facing shank 20. The second smallest barb 34b is rotated 120 degrees about axis C to edge 32b, and is spaced somewhat closer to the base 28 of point section 24. The third smallest barb 34c is further rotated another 120 degrees about axis C to edge 32c, and is spaced even closer to base 28. The forth or last and largest barb is a conventional fish hook barb 34d which is rotated another 120 degrees about axis C to edge 32a which is again facing shank 20 and is positioned at base 28. Thus, beginning near point 26, the barbs 34 progressively increase in size as they are spaced and positioned in a spiral configuration around axis C of point section 24 to the last (conventional) barb 34d at the base 28 of point section 24.

The smallest barb 34a near point 26 allows the angler the opportunity of an initial hook engagement by applying minimal penetration force as soon as the fish begins to nibble on the bait. The angler can then continue the hook-set by applying additional force to achieve a final, deeper, and more secure hook-set from the barbs 34 located on all three edges 32 of point section 24, and especially from the largest barb 34d at the base 28 of point section 24. The sharp edges 32 of the faceted point section 24 serve as cutting edges to allow hook 10 to penetrate the fish's mouth faster and with the minimum penetrating force required by the angler. These unique features result in a larger percentage of hookups, faster, more secure hookups and more fish caught.

OPERATION AND USE OF THE INVENTION

The invention is used in a manner similar to that of a conventional fish hook with a slightly modified method of setting the hook. With a conventional fish hook, an angler may wait a few seconds after detecting a bite to allow the fish to better grip the bait and take the hook further into its mouth before setting the hook. With the present invention, there is a very small barb near the point of the hook, and the angler should produce an initial hook-set almost immediately upon detecting the slightest nibble by a fish. The angler would then complete the hook-set by applying additional force to engage the barbs on all three edges of the point section, and especially the last and largest barb located at the base of the point section. With this invention the angler will notice that less force is required to achieve an effective hook-set and that the fish will be less likely to be able to disengage or free the hook. There will be a higher percentage of hookups and more fish caught.

CONCLUSION

The multiple barb fish hook can be made of various materials and in various sizes to be used for different species of fish. It has needed advantages for the recreational fisherman and for some applications of commercial fishing. Fishing equipment has evolved over the years with some rather complex and technical products. Fish hooks, on the other hand, are available in increasingly more varied sizes and shapes, but the standard fish hook hasn't improved much, even though the hook is the basic element of fishing equipment.

It should be understood that the phraseology or terminology employed herein is for purposes of description and not of limitation. Workers skilled in the art will recognize additions, deletions, and other modifications that can be made in form and detail without departing from the spirit and scope of the invention. Thus, the scope of the invention should be determined by the appended claims, and not by the specific examples given.

From the above-described features, it should be seen that this invention is unique and has a number of significant advantages over the prior art. It is a relatively simple one-piece device that can be used by an angler to increase the percentage of hookups while fishing, and easily produce more secure hookups to reduce the likelihood of fish dislodging the hook after they are hooked. It requires very little change in the fishing technique employed by the fisherman and will result in a larger catch. Clearly, this invention is well adapted to meet the conditions of practical use by anglers of all types, and it should be evident that this invention provides many advantages, is novel, and worthy of patentable merit over the prior art.

The invention claimed is:

1. A fish hook comprising an eye with an eye opening for connecting said fish hook to a fishing line, a shank, a curve section, and a point section, said fish hook being a wire-like member with a center axis, said fish hook having said eye at one end of said fish hook and said point section at an opposite end of said fish hook, all integrally formed, said curve section being generally U-shaped and extending from said shank to said point section, said point section being of a three-sided pyramidal configuration comprising a point, three facets, three edges with one edge of said three edges where each of said facets join, at least three barbs with at least one said barb of said at least three barbs on each of said three edges, and a base, said at least three barbs all being of different sizes comprising a smallest barb, at least one intermediate sized barb, and a largest barb, with said smallest barb positioned on one edge of said three edges near said point and said largest barb positioned on one edge of said three edges at said base, said three facets being identical in cross-sectional configuration, said at least three barbs being sequentially disposed around said center axis, smallest to largest, in a spiral configuration wherein the diameter of said pyramidal configuration increases, beginning near said point and progressing to said base with said largest barb disposed at said base facing said shank.

2. The fish hook of claim 1 further comprising a shaft and offset section between said eye and said shank integrally formed with said eye and said shaft.

3. The fish hook of claim 1 wherein said facets are flat when viewed from the top along the sides of a horizontal cross-section of said point section.

4. The fish hook of claim 1 wherein said facets are concave when viewed from the top along the sides of a horizontal cross-section of said point section.

5. The fish hook of claim 1 wherein said point section has three barbs of said at least three barbs, one barb on each said edge of said point section.

6. The fish hook of claim 1 wherein said point section has four barbs of said at least three barbs, two barbs on said edge facing said shank and one said barb on each of the other two said edges of said three edges.

7. The fish hook of claim 2 wherein said facets are flat when viewed from the top along the sides of a horizontal cross-section of said point section.

8. The fish hook of claim 2 wherein said facets are concave when viewed from the top along the sides of a horizontal cross-section of said point section.

9. The fish hook of claim 2 wherein said point section has three barbs of said at least three barbs, one barb on each said edge of said point section.

10. The fish hook of claim 2 wherein said point section has four barbs of said at least three barbs, two barbs on said edge facing said shank and one said barb on each of the other two said edges of said three edges.

11. The fish hook of claim 3 wherein said point section has three barbs of said at least three barbs, one barb on each said edge of said point section.

12. The fish hook of claim 3 wherein said point section has four barbs of said at least three barbs, two barbs on said edge facing said shank and one said barb on each of the other two said edges of said three edges.

13. The fish hook of claim 4 wherein said point section has three barbs of said at least three barbs, one barb on each said edge of said point section.

14. The fish hook of claim 4 wherein said point section has four barbs of said at least three barbs, two barbs on said edge facing said shank and one said barb on each of the other two said edges of said three edges.

* * * * *